Figure 1:
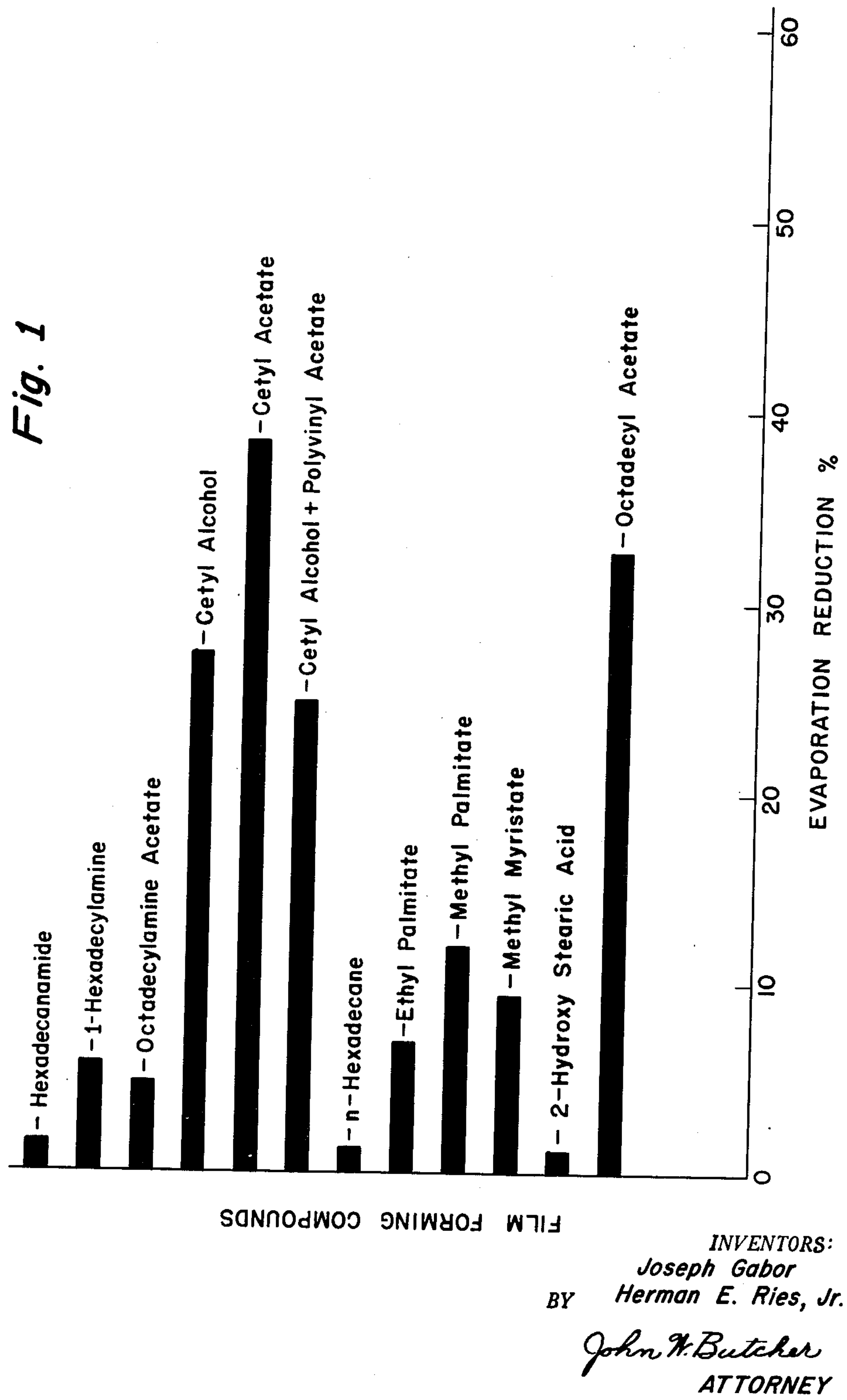

PROTECTIVE FILM TO PREVENT EVAPORATION

Filed Sept. 10, 1962 2 Sheets-Sheet 1

INVENTORS:
Joseph Gabor
Herman E. Ries, Jr.
BY
John W. Butcher
ATTORNEY

PROTECTIVE FILM TO PREVENT EVAPORATION

Filed Sept. 10, 1962 2 Sheets-Sheet 2

INVENTORS:
Joseph Gabor
Herman E. Ries, Jr.
BY
John W. Butcher
ATTORNEY 3,199,944
Patented Aug. 10, 1965

3,199,944

PROTECTIVE FILM TO PREVENT EVAPORATION

Joseph Gabor, Hammond, Ind., and Herman E. Ries, Jr., Chicago, Ill., assignors to Standard Oil Company, Chicago, Ill., a corporation of Indiana Filed Sept. 10, 1962, Ser. No. 223,291
28 Claims. (Cl. 21—60.5)

This is a continuation-in-part of application Serial No. 849,218, filed October 28, 1959, now abandoned.

This invention relates to retardation of water surface evaporation. It particularly relates to an improved method for retarding the evaporation of water from large open bodies thereof, especially from reservoirs having extended surfaces normally in contact with the atmosphere.

The problem of retarding water evaporation to conserve water is old and well known throughout the world. The loss of water due to evaporation from surface or bulk water supplies such as large open ponds, reservoirs, lakes, and snow fields is frequently greater than the amount used for agricultural and industrial purposes, and for human consumption. For example, many regions of the world depend upon melting snow as a primary source of water. The amount of water lost due to evaporation from snow accumulations may range from as little as 10% to as much as 60% of the total snow accumulation. Conservation of ground moisture is especially important in agricultural regions. Such water is in microscopic form and is lost from the soil by evaporation and through plant transpiration. Means to conserve such moisture is extremely desirable especially for regions of little rainfall and those regions that depend upon irrigation.

Certain materials will spread over the surface of water and form a film one molecule in thickness. Certain of these films present a barrier to evaporation of water. To be of practical value, the film must be economical in terms of the cost of materials and in terms of application technique. This film must also be resistant or be self-healing in response to adverse meteorlogical conditions such as wind, dust, and rainfall. These requirements restrict the list of materials which have offered promise under ideal conditions. Various fatty alcohols such as, for example, cetyl alcohol, myristyl alcohol, stearyl alcohol, and oleyl alcohol have been used for this purpose. Cetyl alcohol is generally considered as the preferred alcohol of the above mentioned compounds. The fatty alcohols retard evaporation to a moderate degree but are subject to the disadvantage that they are in the crystalline form at normal application temperatures. The film formation from a crystalline structure may be less effective because of the length of time necessary to establish the film over the surface of water, especially on large bodies of water. Numerous techniques have been used to distribute these crystalline materials in such a manner that they form a film over the surface of the water in a minimum amount of time. For example, workers have powdered the crystals to increase the surface area of the crystal and, thus, increase the rate of film formation. This technique gives rise to other problems such as a method of suspending and distributing the finely divided crystals on the surface of the water. Other workers have added surface active agents to the alcohol to increase the rate of film formation from the solid structure. Obviously, these techniques in turn create their own specific problems. The grinding technique aids the spreading rate of the alcohol but adds to the over-all cost of using the alcohol. The use of a solvent or the use of a surface active agent in combination with the alcohol decreases the evaporation retardation property of the alcohol, adds to the cost of using alcohol and may pose a pollution problem.

It has been discovered that esters of short-chain fatty acids, namely of formic, acetic and propionic acids, and long-chain fatty alcohols are highly efficient monomolecular film-forming materials and function as extremely effective water evaporation retardants. Such esters have the formula:

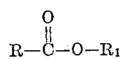

wherein R is selected from the group consisting of hydrogen, methyl and ethyl groups, and $R_1$ is an alkyl group containing from about 10 to about 36 carbon atoms. Particularly effective film-forming esters used in this invention are the acetic acid esters of long-chain fatty alcohols, preferably the long straight-chain fatty alcohols, having the formula:

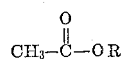

wherein R is an alkyl group containing from about 10 to about 36, preferably 10 to about 18, carbon atoms. The acetic acid esters wherein R is an alkyl group containing from about 10 to about 16 carbon atoms are liquid at normal application temperatures and, therefore, possess highly desirable spreading properties. The preferred ester is cetyl acetate. Cetyl acetate has a spreading rate considerably greater than the spreading rate of cetyl alcohol. The cetyl acetate forms a film which film exhibits better water evaporation retardation properties than any of the previously known monomolecular film-forming materials.

Briefly, the method of this invention comprises applying to an aqueous surface capable of evaporation an ester of a fatty alcohol having the formula:

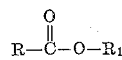

wherein R is selected from the group consisting of hydrogen, methyl and ethyl groups, and $R_1$ is an alkyl group containing from about 10 to about 36 carbon atoms. After application, the ester spreads over the surface of the water and forms a film thereon. The film is preferably one molecule thick; however, under some conditions it may be polymolecular. This film acts as a barrier to the evaporation of water, is permeable to light, oxygen and carbon dioxide, and when present on the surface of large bodies of water is self-healing in response to adverse environmental conditions, such as dust, wind and rain.

Various experiments were performed to determine the effectiveness of the ester films. The experiments were performed by exposing water in Berzelius high form 400 cc. beakers to room conditions within the laboratory. Each beaker initially contained 400 cc. of water. Equal areas of water were exposed in each beaker. Protective films were formed using various chemicals on the surface of the water within the various beakers. The beakers were allowed to stand for several days and were weighed to determine the weight of water evaporated. The following data were obtained as a result of these experiments. Data obtained with respect to cetyl alcohol and cetyl acetate are given in Table I.

*Table 1*

| Material | Wt. loss, 10 days (gms.) | Wt. loss, 17 days (gms.) | Avg. loss 10 days (gms.) | Avg. loss 17 days (gms.) | Evaporation Reduction Percent, 10 days | Evaporation Reduction Percent, 17 days |
|---|---|---|---|---|---|---|
| Water | 85.1<br>87.3 | 151.9<br>154.5 | 86.2 | 153.2 | | |
| Water + a film of cetyl alcohol | 63.2<br>66.0 | 113.1<br>115.5 | 64.6 | 114.3 | 25.1 | 25.4 |
| Water + a film of cetyl acetate | 53.7<br>55.6 | 94.7<br>94.6 | 54.7 | 94.7 | 36.5 | 38.2 |

FIGURE 1 illustrates the relative evaporation retardation property of 12 separate chemical films. The data for this figure were obtained from the formula:

$$E_r = \frac{(W_0 - W_f) - (F_0 - F_f)}{(W_0 - W_f)} \times 100$$

wherein $E_r$=evaporation reduction, percent.
$W_0$=weight of water in the beaker at the beginning of the test.
$W_f$=weight of water in the beaker at the end of the test.
$F_0$=weight of the water plus the weight of the chemical film in the beaker at the beginning of the test.
$F_f$=weight of the water plus the weight of the chemical film in the beaker at the end of the test.

The unprotected water standard and the chemical film protected samples having the same evaporation surface area were allowed to evaporate under similar conditions.

Figure 2:
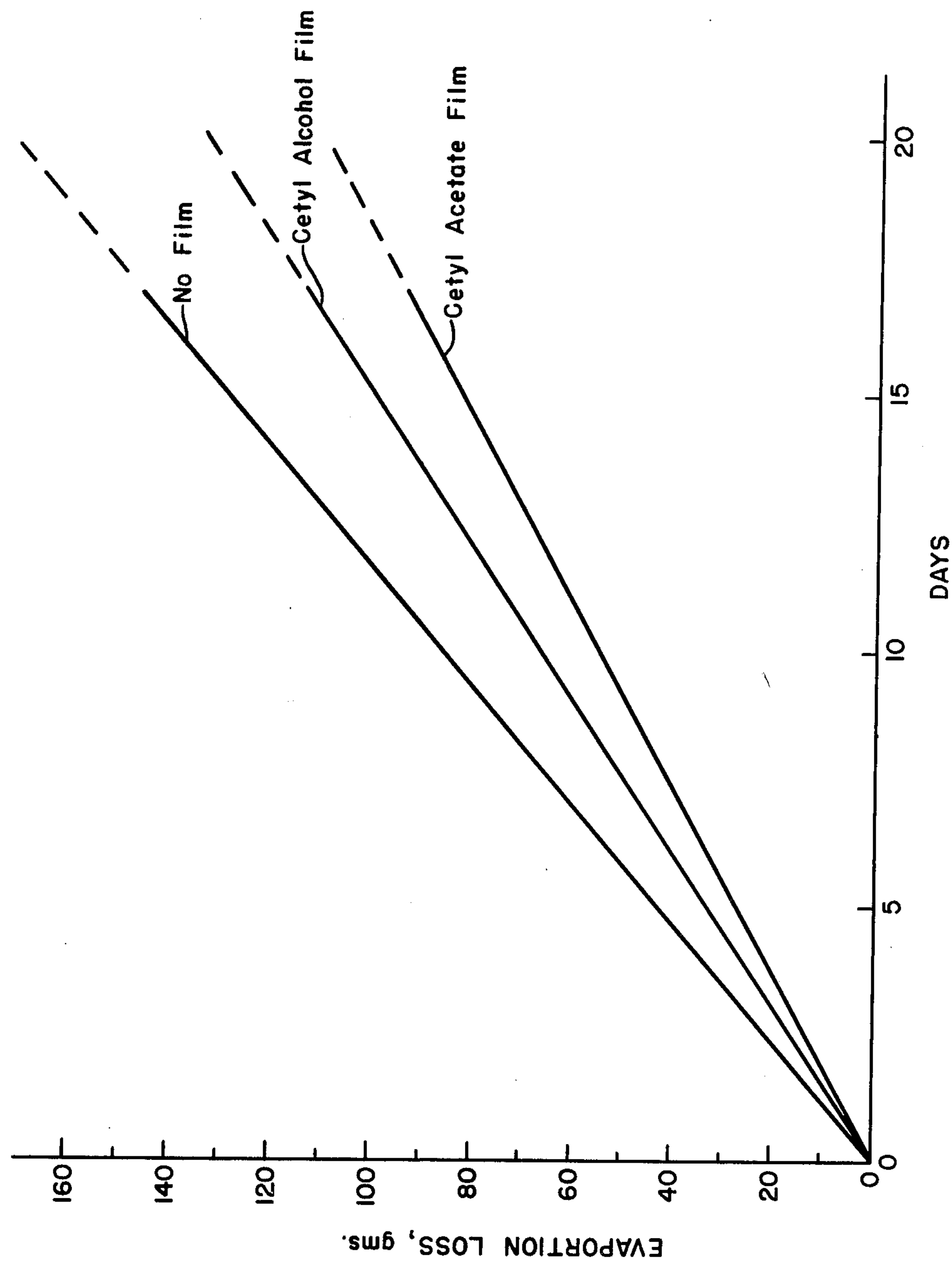

FIGURE 2 illustrates the relative effectiveness of the cetyl acetate and cetyl alcohol. The data used in this figure were obtained from the data of Table 1.

The method of this invention provides a means for retarding the evaporation of water from aqueous surfaces capable of evaporation. Such surfaces can range in size from large bodies of water either in liquid or solid form such as ice or snow, wherein extended areas are in contact with the atmosphere to microscopic surfaces, such as are present in soil and in plants.

A specific embodiment of the invention is a method for retarding the evaporation of water from the surface of a large body of water which comprises applying to said water surface an amount of the herein described ester sufficient to form a film on a substantial proportion of the water surface.

Another specific embodiment of the invention is a method for retarding transpiration by a living plant, which comprises applying to said plant an ester as herein described.

A further embodiment of the invention is a method for retarding evaporation of water from soil, which comprises applying to the soil a herein described ester.

In the practice of this invention, the ester is applied in any manner known to the art for applying liquids and solids to water and land. The application of the esters can be accomplished by spraying, dusting, dripping or by any combination of these means to give a regulated and continual make-up when applied to extend water surfaces. In connection with the retardation of moisture from plants and soil, the ester can be applied by spraying a given area, by spraying or dusting the plant or earth surface, or by sub-surface application. Another convenient method for applying the esters to land is to concurrently apply such esters with insecticides, solid and liquid fertilizers. Where land is irrigated, the ester can be applied to the water used for irrigation, which application serves a two-fold purpose, namely, retarding evaporation of water from the distribution system and ultimately applied to the land surfaces to retard evaporation from the land.

Cetyl acetate is a highly efficacious water evaporation retardant. It has low volatility and a high affinity for water. It is a very active surfactant and spreads spontaneously upon contact with water to form monomolecular films. Consequently, it is extremely useful as an evaporation retardant for large bodies of water, soil, and plants.

Loss of ground moisture by evaporation is extensive. Moisture travels by capillary movement through the soil to the land surface from which it evaporates. Even though the evaporating surface is microscopic, the evaporation can be retarded in accordance with this invention. Moisture coming in contact with the herein described esters either beneath or at the soil surface will have the ester applied to its surface so that upon exposure to evaporating conditions there will be a film covering the water surface. Under such conditions, cetyl acetate is particularly effective due to its affinity for water.

The loss of water through transpiration by living plants is extremely important in connection with agricultural crops, especially in periods of little rainfall. When cetyl acetate is applied to living plants or to the soil in which the plant is rooted, there is a retardation of transpiration. While the exact mechanism for this retarding effect is not known, it is believed that the effect is produced by either a migration of the cetyl acetate through the soil to the root system of the plant from where it is transported to the evaporation areas of the leaf, or by the formation of microscopic monomolecular films over the evaporating areas of the leaves. Consequently, spraying a plant area retards evaporation of water from the soil and also transpirtion by living plants.

Generally, the amount of the ester to be applied to the aqueous surface capable of evaporation can be determined by mere routine tests by one skilled in the art in possession of this disclosure, bearing in mind the extent and duration of protection desired. Since the object of applying the ester to aqueous surfaces is to form a substantially monomolecular film of the ester, the amount of the ester that is applied will depend upon whether the aqueous surface is a large body of water or whether the ester is applied to land and plants. Specific amounts of the ester are not critical so long as the amount applied is sufficient to enable the ester to form a substantially monomolecular film over a substantial portion of the aqueous evaporating surface. Maximum retardation is effected when all of the aqueous evaporating surface is covered.

When the ester either in solid or liquid form is applied to the aqueous surface, the molecules on the periphery of the crystal or the molecules on the periphery of the liquid ester are extracted to the surface of the water. These molecules are removed from their normal position adjacent similar neighboring molecules and spread over the surface of the water until the outer extremities thereof are reached and all intermediate spaces on the surface of the water are occupied. At this time, a substantially monomolecular film has been formed over the surface of the water and the surface pressure of the film is in equilibrium.

Thus the present invention provides an economical method for retarding the evaporation of water from aqueous surfaces capable of evaporation, which surfaces can be macroscopic as in large bodies of water or microscopic such as are present in soil and in plants.

Thus having described the invention, what is claimed is:

1. A method for retarding evaporation of water which method comprises applying to an aqueous surface capable of evaporation an ester of a fatty alcohol having the formula:

$$R-\overset{O}{\overset{\|}{C}}-O-R_1$$

wherein R is selected from the group consisting of hydrogen, methyl and ethyl groups, and $R_1$ is an alkyl group containing from about 10 to about 36 carbon atoms.

2. The method of claim 1 wherein R is the methyl group.

3. The method of claim 1 wherein R is the methyl group and $R_1$ is an alkyl group containing from 10 to about 18 carbon atoms.

4. The method of claim 1 wherein said ester is cetyl acetate.

5. The method of claim 1 wherein said ester is octadecyl acetate.

6. A method for retarding evaporation of water from the surface of a large body of water which method comprises applying to said water surface an ester of a fatty alcohol having the formula:

$$R-\overset{O}{\overset{\|}{C}}-O-R_1$$

wherein R is selected from the group consisting of hydrogen, methyl and ethyl groups, and $R_1$ is an alkyl group containing from about 10 to about 36 carbon atoms.

7. A method for retarding evaporation from the surface of a large body of water which method comprises applying to said surface a film of an ester of a long straight chain fatty alcohol having the formula:

$$R-\overset{O}{\overset{\|}{C}}-O-R_1$$

wherein R is selected from the group consisting of hydrogen, methyl and ethyl groups, and $R_1$ is an alkyl group containing from about 10 to about 36 carbon atoms.

8. A method for retarding evaporation from the surface of a large body of water which comprises applying to said surface a film of an acetic acid ester of a long chain fatty alcohol having the formula:

$$CH_3-\overset{O}{\overset{\|}{C}}-OR$$

wherein R is an alkyl group containing from about 10 to about 36 carbon atoms.

9. A method for retarding evaporation from the surface of a large body of water which comprises applying to said surface a film of an acetic acid ester of a long chain fatty alcohol having the formula:

$$CH_3-\overset{O}{\overset{\|}{C}}-OR$$

wherein R is an alkyl group containing from about 10 to about 18 carbon atoms.

10. A method for retarding evaporation from the surface of a large body of water which comprises applying a film of cetyl acetate to said surface.

11. A method for retarding evaporation from the surface of a large body of water which comprises applying a film of octadecyl acetate to said surface.

12. A method for retarding evaporation from the exposed surface of a snow accumulation which comprises applying to said surface a film of an ester of a long straight chain fatty alcohol having the formula:

$$R-\overset{O}{\overset{\|}{C}}-O-R_1$$

wherein R is selected from the group consisting of hydrogen, methyl and ethyl groups and $R_1$ is an alkyl group containing from about 10 to about 36 carbon atoms.

13. The method of claim 12 wherein said ester is an acetic acid ester having the formula:

$$CH_3-\overset{O}{\overset{\|}{C}}-OR$$

wherein R is an alkyl group containing from about 10 to about 36 carbon atoms.

14. The method of claim 12 wherein said ester is an acetic acid ester having the formula:

$$CH_3-\overset{O}{\overset{\|}{C}}-OR$$

wherein R is an alkyl group consisting from about 10 to about 18 carbon atoms.

15. The method of claim 12 wherein said ester is cetyl acetate.

16. The method of claim 12 wherein said ester is octadecyl acetate.

17. A method for retarding transpiration by a living plant which comprises applying to said plant an ester of a fatty alcohol having the formula:

$$R-\overset{O}{\overset{\|}{C}}-O-R_1$$

wherein R is selected from the group consisting of hydrogen, methyl and ethyl groups, and $R_1$ is an alkyl group containing from about 10 to about 36 carbon atoms.

18. The method of claim 17 wherein said ester is applied by spraying the plant.

19. The method of claim 17 wherein said ester is applied to the soil in which said plant is rooted.

20. The method of claim 17 wherein R is the methyl group.

21. The method of claim 17 wherein R is the methyl group and $R_1$ is an alkyl group containing from 10 to about 18 carbon atoms.

22. The method of claim 17 wherein said ester is cetyl acetate.

23. The method of claim 17 wherein said ester is octadecyl acetate.

24. A method for retarding evaporation of water from soil which method comprises applying to soil an ester of a fatty alcohol having the formula:

$$R-\overset{O}{\overset{\|}{C}}-O-R_1$$

wherein R is selected from the group consisting of hydrogen, methyl and ethyl groups, and $R_1$ is an alkyl group containing from about 10 to about 36 carbon atoms.

25. The method of claim 24 wherein R is the methyl group.

26. The method of claim 24 wherein R is the methyl group and $R_1$ is an alkyl group containing from 10 to about 18 carbon atoms.

27. The method of claim 24 wherein said ester is cetyl acetate.

28. The method of claim 24 wherein said ester is octadecyl acetate.

References Cited by the Examiner

UNITED STATES PATENTS 3,036,880 5/62 Malkemus ------------ 21—60.5

OTHER REFERENCES

Rosano et al.: Journal of Physical Chemistry, volume 60, pages 348–353, March 1956.

DONALL H. SYLVESTER, *Primary Examiner.*

MORRIS O. WOLK, *Examiner.*

UNITED STATES PATENT OFFICE

CERTIFICATE OF CORRECTION

Patent No. 3,199,944 August 10, 1965

Joseph Gabor et al.

It is hereby certified that error appears in the above numbered patent requiring correction and that the said Letters Patent should read as corrected below.

Column 6, line 15, for "consisting" read -- containing --.

Signed and sealed this 15th day of February 1966.

(SEAL)
Attest:

ERNEST W. SWIDER
Attesting Officer

EDWARD J. BRENNER
Commissioner of Patents